United States Patent

Ishiyama

[11] Patent Number: 5,956,116
[45] Date of Patent: Sep. 21, 1999

[54] FRAME FOR EYEGLASSES

[75] Inventor: Etsuya Ishiyama, Sabae, Japan

[73] Assignee: Eiko Ishiyama, Sabae, Japan

[21] Appl. No.: 09/035,284

[22] Filed: Mar. 5, 1998

[30] Foreign Application Priority Data

May 30, 1997 [JP] Japan ................................. 9-142194
Aug. 26, 1997 [JP] Japan ................................. 9-229878

[51] Int. Cl.⁶ ........................... G02C 01/08; G02C 5/02
[52] U.S. Cl. ........................ 351/90; 351/98; 351/124; 351/133
[58] Field of Search ..................... 351/90, 91, 92, 351/93, 94, 95, 96, 97, 98, 99, 100, 101, 102, 124, 133–135, 140, 152

[56] References Cited

U.S. PATENT DOCUMENTS 2,551,144  5/1951  Lindemann et al. ..................... 351/98
3,758,203  9/1973  Lipchik et al. ........................ 351/133

FOREIGN PATENT DOCUMENTS

1049822  1/1954  France ..................................... 351/90

*Primary Examiner*—Huy Mai
*Attorney, Agent, or Firm*—Bacon & Thomas, PLLC

[57] ABSTRACT

A frame for eyeglasses permits markedly reduced time and labor required for assembly, and higher production efficiency, and it also enables high quality to be achieved at all times without depending on the experience or judgment of individual workers. The frame for eyeglasses is equipped with: an upper half composed of a pair of half-rims, a bridge for connecting the half-rims, and installing sections provided at the outer ends of the two half-rims; a lower half which has a bridge opposed to the bridge of the upper half, and installing sections opposed to the installing sections of the upper half; a bridge connecting member for connecting the two bridges into one piece; an end piece for integrally joining the installing sections of the upper half and the lower half; and a temple connected to the end piece.

3 Claims, 14 Drawing Sheets

FRAME FOR EYEGLASSES

BACKGROUND OF THE INVENTION

1. Field of the Invention

The present invention relates to a frame for eyeglasses and, more particularly, to a frame for eyeglasses which permits higher production efficiency.

2. Description of Related Art

There are a variety of types of frames for eyeglasses used for correcting eyesight, protecting eyes from ultraviolet rays, or for other purposes.

In general, a frame for eyeglasses is constituted by a pair of annular rims, a bridge for connecting the two rims, an end piece provided on the outer side of each rim, a temple pivotally connected to each end piece, and a pad arm which is provided on the inner side of each rim and which is provided with a pad at the bottom end thereof.

Lenses are positioned in the annular rims of the frame for eyeglasses configured as described above and fixed by decreasing the diameters of the rims by tightening the rims with screws or the like.

In a conventional frame for eyeglasses, however, both ends of the bridge are secured to the rims by welding or the like, and the end pieces and pad arms are also secured to the rims by welding. Hence, the conventional frames for eyeglasses have many welding spots and hence require many assembly steps, resulting in low production efficiency.

Furthermore, welding operation frequently depends on the experience or judgment of individual workers; therefore, it has been difficult to ensure high quality at all times.

SUMMARY OF THE INVENTION

Accordingly, it is an object of the present invention to provide a frame for eyeglasses, which frame permits a marked reduction in the total number of welding spots and in the time and effort required for the assembly, thereby to achieve higher production efficiency, and also to always ensure high quality without depending on the skill of individual workers.

To this end, according to one aspect of the present invention, there is provided a frame for eyeglasses, which frame is constituted by: an upper half composed of a pair of half-rims, a bridge for connecting the half-rims, and installing sections provided at the outer ends of the two half-rims; a lower half which has a bridge opposed to the bridge of the upper half, and installing sections opposed to the installing sections of the upper half; a bridge connecting member for integrally joining the two bridges; an end piece for integrally connecting the installing sections of the upper half and the lower half; and a temple connected to the end piece.

According to another aspect of the present invention, there is provided a frame for eyeglasses, which frame is constituted by: an upper half composed of a pair of half-rims spaced away from each other with a predetermined interval provided therebetween, a bridge for connecting the inner sides of the half-rims, and installing sections respectively provided at the outer sides of the two half-rims; a lower half composed of a pair of half-rims opposed to the half-rims of the upper half, a bridge opposed to the bridge of the upper half, and installing sections opposed to the installing sections of the upper half; a bridge connecting member composed of a main body having a groove, in which the two bridges can be fitted, and a holding member for integrally fixing the two bridges in the groove of the main body; an end piece for connecting the installing sections of the upper half and the lower half into one piece; and a temple connected to the end piece; wherein the outer peripheral edge of a lens is held by the half-rim of the upper half and the half-rim of the lower half.

In a preferred form of the invention, a pad can be attached to a bottom end of the holding member making up the foregoing bridge connecting member.

According to still another aspect of the present invention, there is provided a frame for eyeglasses, which frame is constituted by: an upper half comprised of a pair of half-rims spaced away from each other with a predetermined interval provided therebetween, a bridge for connecting the inner sides of the half-rims, and installing sections respectively provided on the outer sides of the two half-rims; a lower half comprised of a pair of half-rims opposed to the half-rims of the upper half, a bridge opposed to the bridge of the upper half, and installing sections opposed to the installing sections of the upper half; a bridge connecting member which can be attached to and detached from the two bridges and which integrally joins the two bridges when it is attached thereto; an end piece for connecting the installing sections of the upper half and the lower half into one piece; and a temple connected to the end piece; wherein the end piece is composed of a main body having a groove, in which the two installing sections are fitted, a cover located at a cavity of the groove, and securing means for clamping the two installing sections between itself and the cover in the interior of the groove to secure them.

According to a further aspect of the present invention, there is provided a frame for eyeglasses, which frame is constituted by: an upper half comprised of a pair of half-rims spaced away from each other with a predetermined interval provided therebetween, a bridge for connecting the inner sides of the half-rims, and installing sections respectively provided on the outer sides of the two half-rims; a bridge rim composed of rim portions formed at both ends thereof and a bridge which approximately matches the bridge of the upper half; a bottom end rim composed of a rim portion and an installing section which approximately matches the installing section of the upper half; an eye wire made of nylon or the like which is extended between the rim portion of the bridge rim and the rim portion of the bottom end rim; an end piece for connecting the installing section of the upper half and the installing section of the bottom end frame; a temple connected to the end piece; and a bridge connecting member for securing the bridge of the upper half and the bridge of the bridge rim; wherein a lens is held by the half-rim of the upper half, the bridge rim, the bottom end rim, and the eye wire made of nylon or the like.

In a preferred form of the invention, the bridge connecting member is composed of a main body which has a groove in which the bridge of the upper half and the bridge of the bridge rim can be fitted, and a holding member for integrally securing both bridges in the groove of the main body, and a pad can be attached to a bottom end of the holding member.

The configuration of the present invention described above enables the upper half and the lower half to be connected by the bridge connecting member, and both installing sections to be connected by the end piece to which the temple is connected, thus assembling the frame for eyeglasses.

The upper half and the lower half are secured integrally by fitting both bridges in the groove of the main body of the bridge connecting member and fixing them integrally by the holding member, then the pads are attached the bottom ends of the holding member. Then, the two installing sections are connected into one piece by the end piece to which the temple has been connected. This completes the assembly of the frame for eyepieces.

The upper half and the lower half are integrally connected by both bridges thereof which are integrally joined by the bridge connecting member, and both installing sections are installed with the end piece to which the temple has been connected. The end piece has the main body wherein both installing sections are fitted in the groove of the main body, and the cover positioned at the cavity of the groove. The two installing sections are clamped by the securing means to fix them. Thus, the frame for eyeglasses is assembled.

The upper half and the bridge frame are connected by both bridges which are integrally joined by the bridge connecting member. The bridge connecting member is composed of the main body having a groove in which both bridges can be fitted in, and the holding member for integrally securing both bridges in the groove of the main body. The pads are attached to the bottom ends of the holding member. Then, the installing section of the upper half and the installing section of the bottom end rim are fixed by the end piece to which the temple has been connected. This completes the assembly of the frame for eyeglasses.

DESCRIPTION OF THE PREFERRED EMBODIMENTS

The embodiments of the present invention will now be explained in conjunction with the accompanying drawings.

FIG. 1 through FIG. 7 show a first embodiment of the frame for eyeglasses in accordance with the present invention. A frame 1 for eyeglasses is equipped with an upper half 2, a lower half 6, a bridge connecting member 10, end pieces 19, and temples 26.

Figure 1:
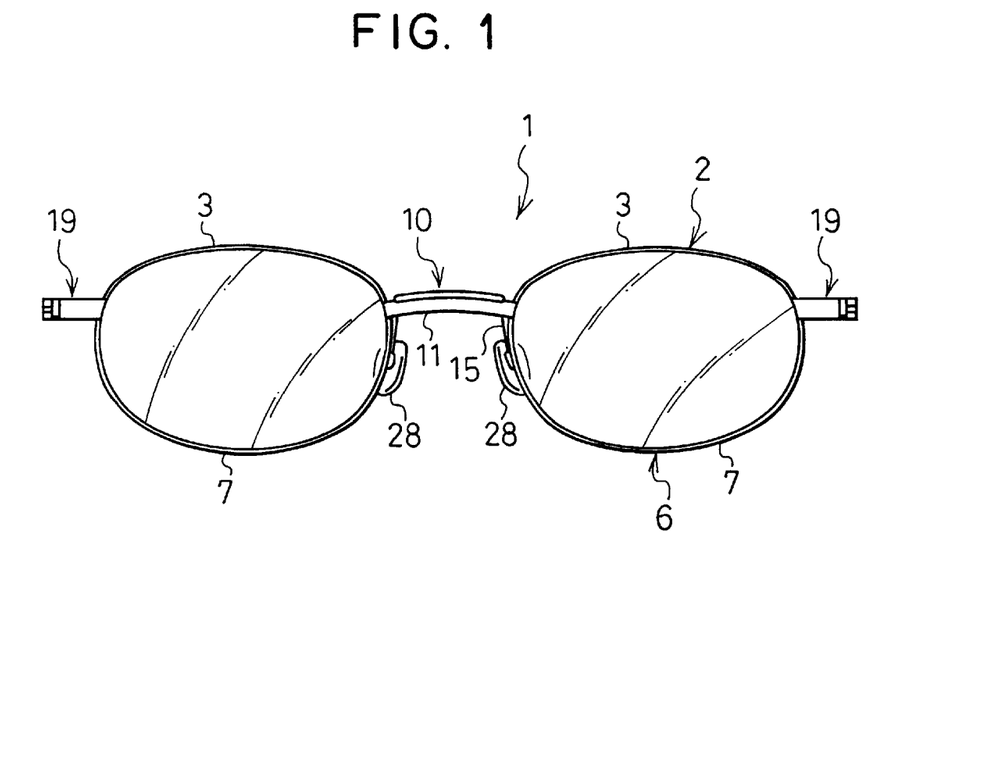
FIG. 1 is a schematic general view showing a first embodiment of a frame for eyeglasses in accordance with the present invention.
Figure 4:
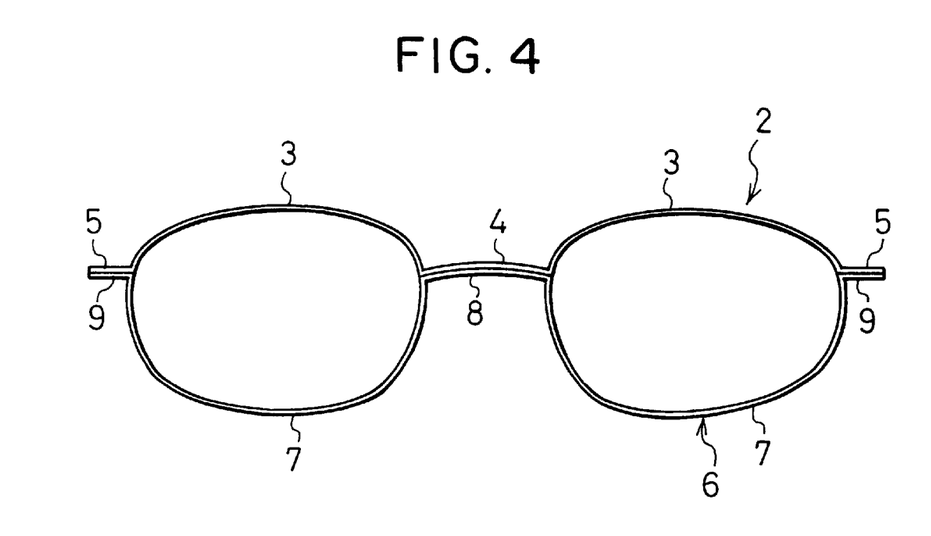
FIG. 4 is a schematic diagram showing the relationship between an upper half and a lower half.

The upper half 2 is made by bending a single metal rod by a press or the like or by casting. The upper half 2 has a pair of half-rims 3, 3 spaced away from each other with a predetermined interval provided therebetween, a bridge 4 between the two half-rims 3, 3, and installing sections 5, 5 on the outer sides of the two half-rims 3, 3. Each of the installing sections 5 has an aperture 5a at the center thereof.

The respective sections of the lower half 6 are made such that they match the respective sections of the upper half 2. As in the case of the upper half 2, the lower half 6 is also made by bending a single metal rod by a press or the like, or by casting. The lower half 6 has a pair of half-rims 7, 7 spaced away from each other with a predetermined interval provided therebetween, a bridge 8 between the two half-rims 7, 7, and installing sections 9, 9 on the outer sides of the two half-rims 7, 7. Each of the installing sections 9 has an aperture 9a at the center thereof.

Figure 5:
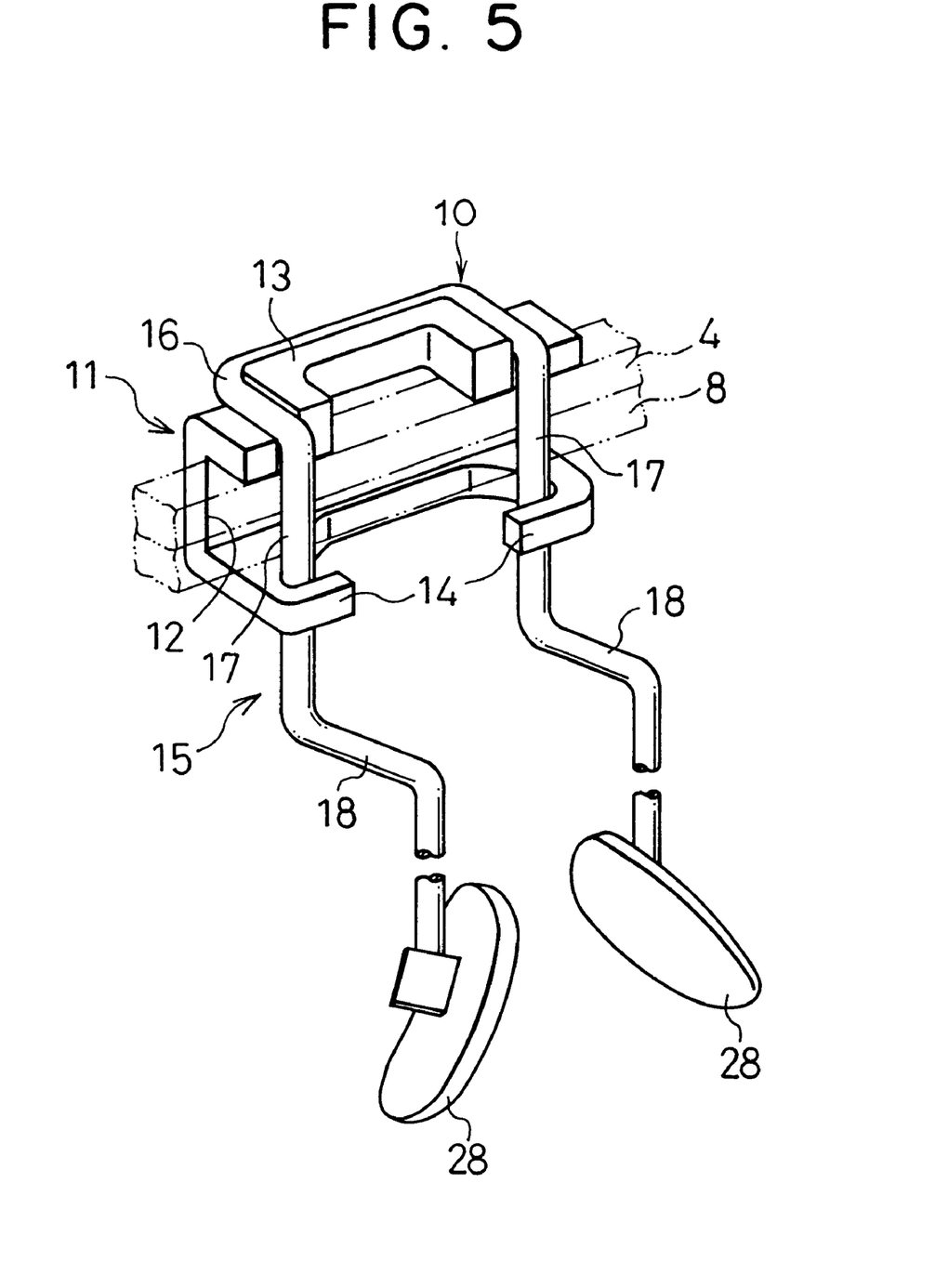
FIG. 5 is an enlarged view of a bridge connecting member shown in FIG. 1.

The bridge connecting member 10 has a main body 11 and a holding member 15 attached to the main body 11; it integrally joins the bridge 4 and the bridge 8 together.

The main body 11 is made of a metal and it has approximately the same length as the bridge 4 and the bridge 8. Formed at the rear of the main body 11 is a groove 12 where the two bridges 4 and 8 are located. A protuberance 13 is provided at the top of the main body 11, C-shaped hooks 14, 14 are integrally formed on both bottom ends of the groove 12, and the holding member 15 is installed between the protuberance 13 and the hooks 14, 14.

The holding member 15 is made by machining a metal rod material. The holding member 15 is composed of: a C-shaped fitting section 16 which is engaged with the protuberance 13 of the main body 11; holding sections 17, 17 which extend over the groove 12 from both ends of the fitting section 16 and are engaged with the hooks 14, 14; and pad arms 18, 18 extending from the holding sections 17, 17, respectively.

The interval between the holding sections 17, 17 is slightly greater than the interval between the hooks 14, 14 of the main body 11. When the holding sections 17, 17 are engaged with the hooks 14, 14, the regaining force of the holding sections 17, 17 secures the holding member 15 to the main body 11.

Figure 6:
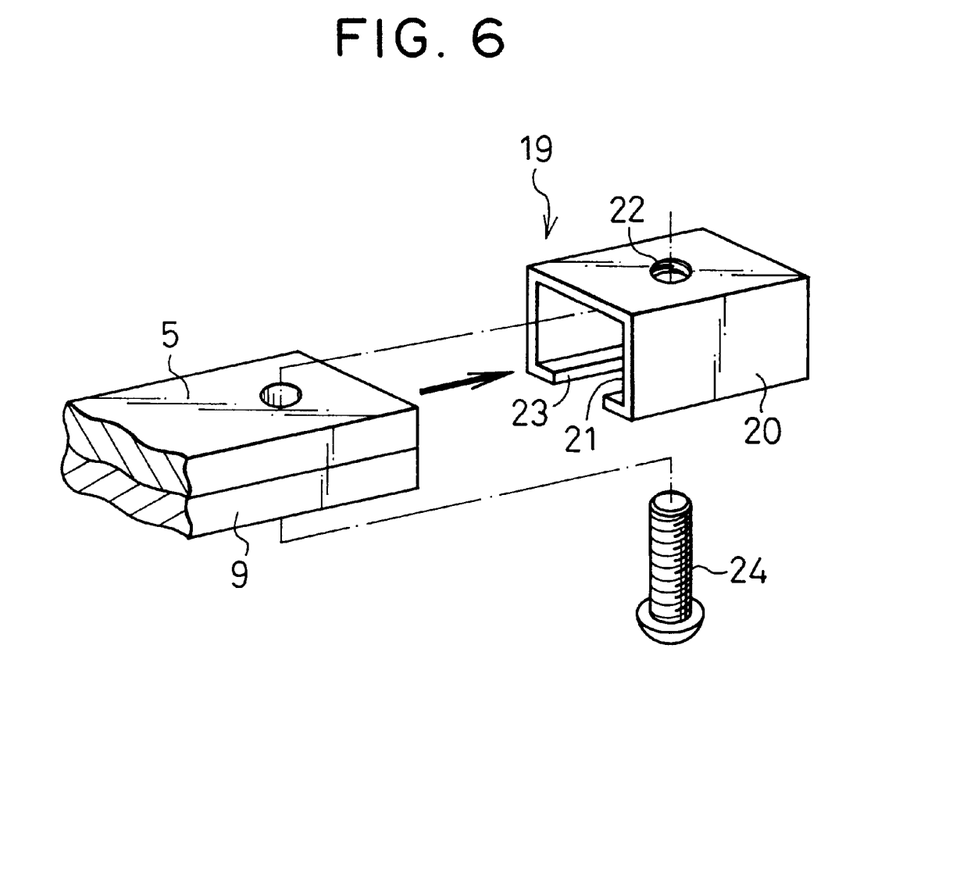
FIG. 6 is an enlarged view of an end piece shown in FIG. 1.
Figure 7:
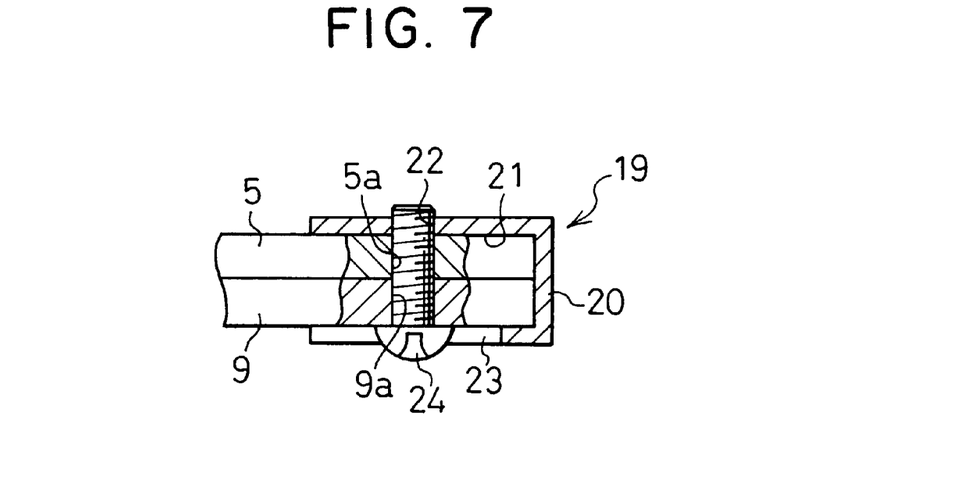
FIG. 7 is a cross-sectional view showing the end piece shown in FIG. 6 which has been assembled.

The end piece 19 serves to integrally fix the installing section 5 of the upper half 2 and the installing section 9 of the lower half 6; it is composed of a main body 20 and a screw 24.

The main body 20 has a groove 21 which is closed on one end thereof and opened on the other end; both installing sections 5 and 9 are positioned in the groove 21. The main body 20 has a tapped hole 22 at the top center thereof and also has a notch 23 at the bottom center thereof. With the two installing sections 5 and 9 positioned in the groove 21 of the main body 20, the screw 24 is inserted in the apertures 5a and 9a of the two installing sections 5 and 9, respectively, through the notch 23, then screws into the tapped hole 22.

Thus, both installing sections 5 and 9 can be secured to the end piece 19.

The temple 26 is pivotally attached through a hinge 25 to the rear surface of the main body 20 of the end piece 19.

Figure 2:
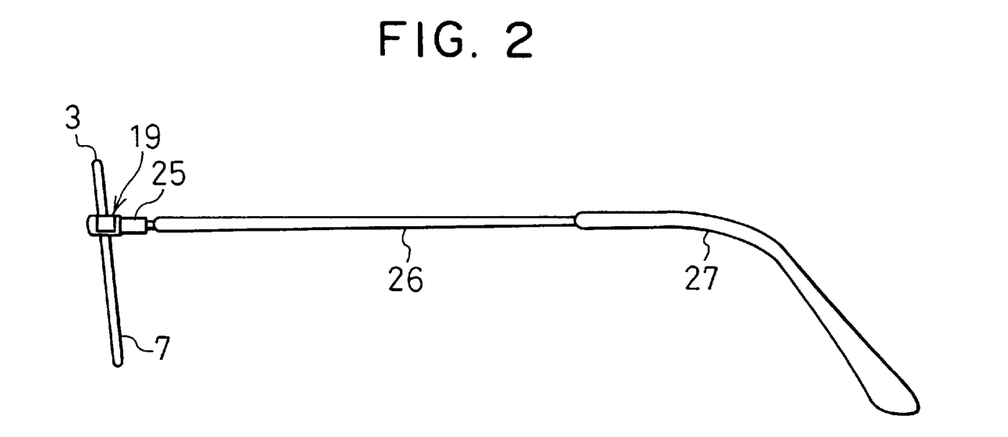
FIG. 2 is a side view of the frame for eyeglasses shown in FIG. 1.
Figure 3:
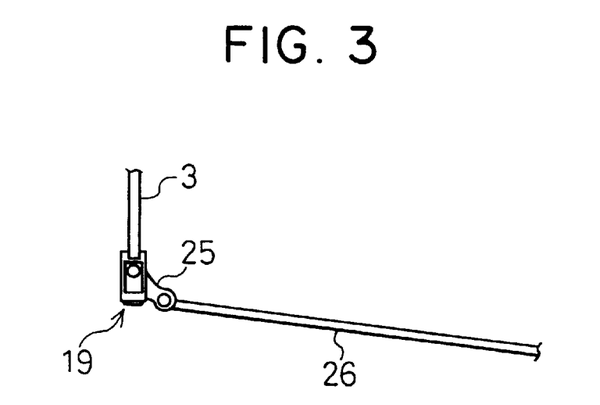
FIG. 3 is a partial top plan view of the frame for eyeglasses shown in FIG. 1.

The end portion of the temple 26 is bent downward; it is provided with a tip 27 made of a synthetic resin material.

The hinge 25 is welded to the main body 20 of the end piece 19. The hinge 25 may be screwed to the main body 20 of the end piece 19 or formed integrally with the end piece 19.

To assemble the frame 1 for eyeglasses, the upper half 2 and the lower half 6 are combined such that the half-rims 3 and the half-rims 7 form two rims, and the bridge 4 and the bridge 8 are butted against each other, and the installing section 5 and the installing section 9 are also butted against each other.

Then, the main body 11 of the bridge connecting member 10 is positioned in front of the bridge 4 and the bridge 8, and the two bridges 4 and 8 are fitted in the groove 12 such that they are held in contact.

In the next step, the holding member 15 of the bridge connecting member 10 is positioned at the rear of the two bridges 4 and 8, the fitting section 16 is engaged with the protuberance 13 of the main body 11, the holding sections 17, 17 are engaged with the hooks 14, 14, and pads 28 made of a synthetic resin material are attached to the bottom ends of the pad arms 18, 18.

Plastic or glass lenses are positioned between the two half-rims 3 and 7, and with both installing sections 5 and 9 butted against each other, the lenses are positioned in the grooves 21 of the main bodies 20 of the end pieces 19. After that, the screws 24 are screwed in the tapped holes 22 through the notches 23 and the apertures 5a and 9a of the two installing sections 5 and 9, respectively.

The temples 26 are attached to the hinges 25 which have been attached to the main bodies 20 of the end pieces 19. This completes the assembly of the frame 1 for eyeglasses.

In the frame 1 for eyeglasses, the upper half 2 and the lower half 6 are respectively formed using a single material and they are assembled into one piece by using the bridge connecting member 10 and the end pieces 19, thus obviating the need for welding.

Hence, the total number of welding places can be reduced, permitting a considerably reduced time and effort required for the assembly with resultant markedly higher production efficiency.

Moreover, since there are fewer welded places, the quality of the product is hardly affected by the experience or judgment of workers, so that high quality of the products can be obtained at all times.

FIG. 8 through FIG. 14 show a second embodiment of the frame for glasses in accordance with the present invention.

Figure 8:
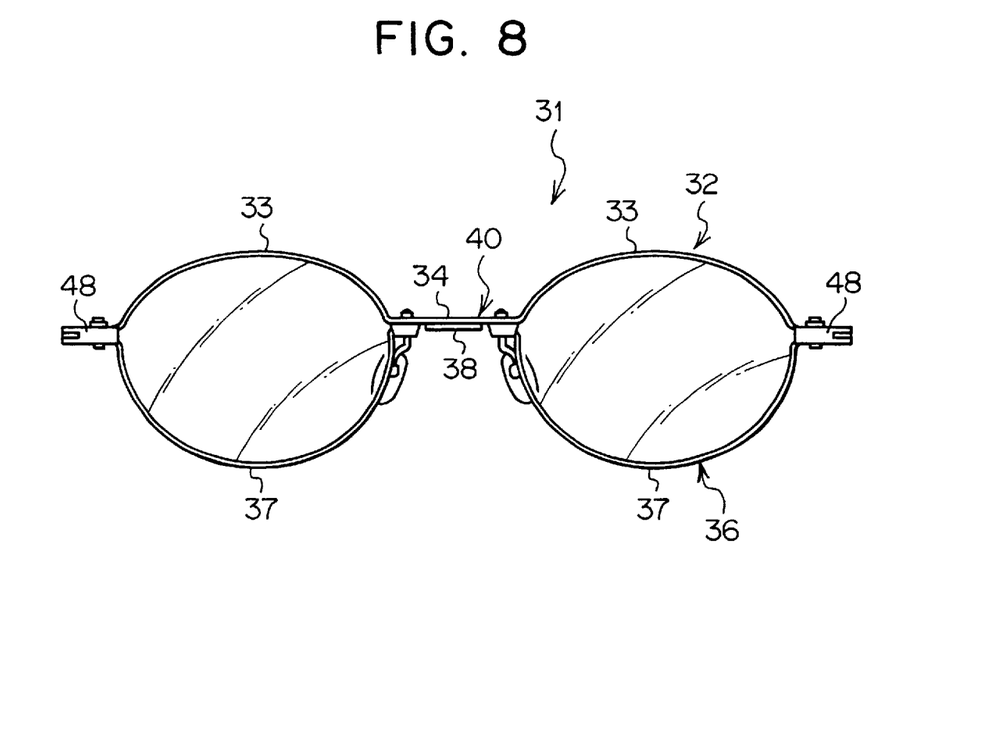
FIG. 8 is a schematic general view showing a second embodiment of a frame for eyeglasses in accordance with the present invention.
Figure 9:
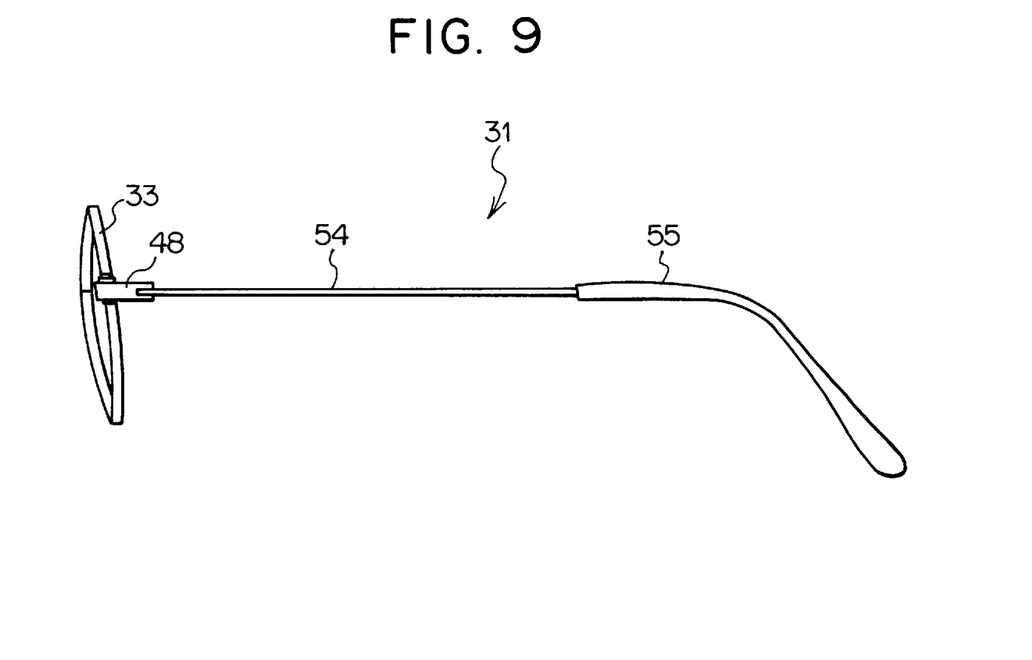
FIG. 9 is a side view of the frame for eyeglasses shown in FIG. 8.
Figure 10:
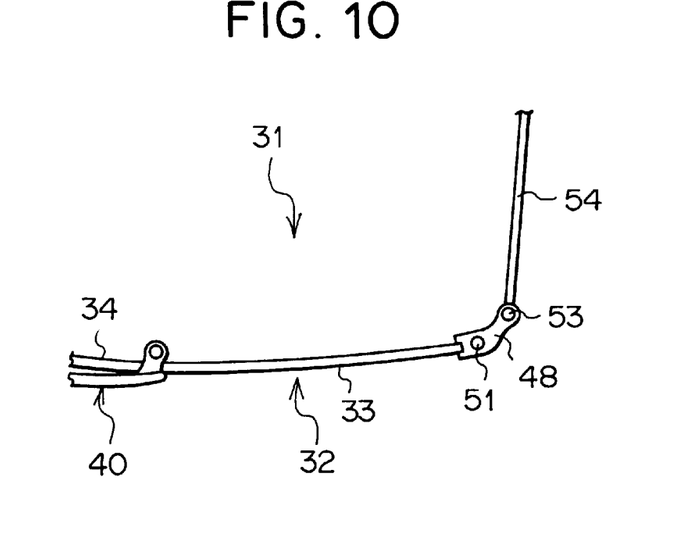
FIG. 10 is a partial top plan view of the frame for eyeglasses shown in FIG. 8.

A frame 31 for eyeglasses is equipped with an upper half 32, a lower half 36, a bridge connecting member 40, end pieces 48, and temples 54.

Figure 11:
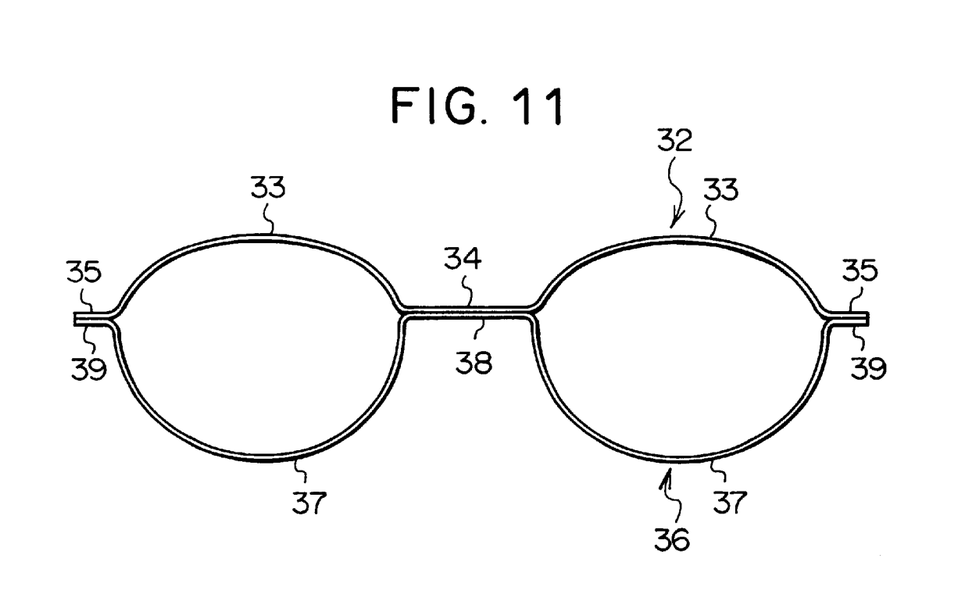
FIG. 11 is a schematic diagram showing the relationship between an upper half and a lower half.

The upper half 32 is made by bending a single metal rod by a press or the like or by casting. The upper half 32 has a pair of half-rims 33, 33 spaced away from each other with a predetermined interval provided therebetween, a bridge 34 between the two half-rims 33, 33, and installing sections 35, 35 on the outer sides of the two half-rims 33, 33. Each of the installing sections 35 has an aperture 35a at the center thereof.

The respective sections of the lower half 36 are made such that they match the respective sections of the upper half 32. As in the case of the upper half 32, the lower half 36 is also made by bending a single metal rod by a press or the like, or by casting. The lower half 36 has a pair of half-rims 37, 37 spaced away from each other with a predetermined interval provided therebetween, a bridge 38 between the two half-rims 37, 37, and installing sections 39, 39 on the outer sides of the two half-rims 37, 37. Each of the installing sections 39 has an aperture 39a at the center thereof.

Figure 12:
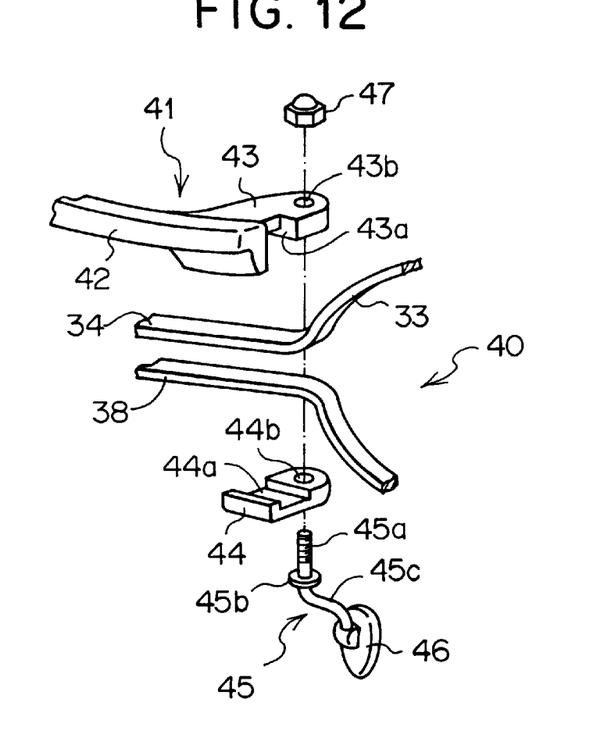
FIG. 12 is an enlarged view of a bridge connecting member shown in FIG. 8.
Figure 13:
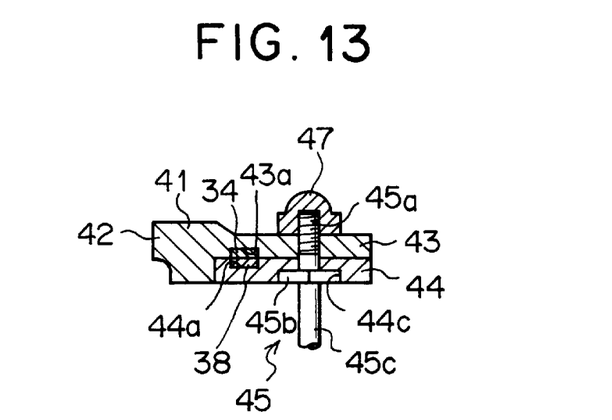
FIG. 13 is a cross-sectional view showing the bridge connecting member shown in FIG. 12 which has been assembled.

The bridge connecting member 40 has an upper member 41, a lower member 44, a connecting screw 45, and a nut 47; it joins the bridge 34 and the bridge 38 into one piece.

The upper member 41 is made of a metal, and it has approximately the same length as the bridge 34 and the bridge 38; it is constructed by a base 42 positioned in front of the two bridges 34 and 38, and protuberances 43 which are provided at both ends of the base 42 and which extend backward.

In each of the protuberances 43, a groove 43a for receiving an end of the frame 33 is provided on the side of the base 42, and an aperture 43b is provided behind the groove 43a.

The lower member 44 is approximately as large as the protuberance 43 of the upper member 41; it has, on the top surface thereof, a groove 44a which matches the bridge 38, an aperture 44b provided behind the groove 44a, and a recessed section 44c provided at the bottom of the aperture 44b.

The recessed section 44c may be triangular, rectangular, hexagonal, elliptic, or of other shape as long as it is not circular.

The connecting screw 45 is comprised of a threaded section 45a which is inserted in the aperture 44b of the lower member 44 and the aperture 43b of the upper member 41, a jaw 45b which is provided integrally with the threaded section 45a and which matches the recessed section 44c, and a pad arm 45c to which a pad 46 made of a synthetic resin material is attached. The jaw 45b and the recessed section 44c together prevent the connecting screw 45 from moving circularly so as to secure the pad 46 in place.

The nut 47 may be a cap nut, a hexagon nut, etc.; there are no particular restrictions.

Figure 14:
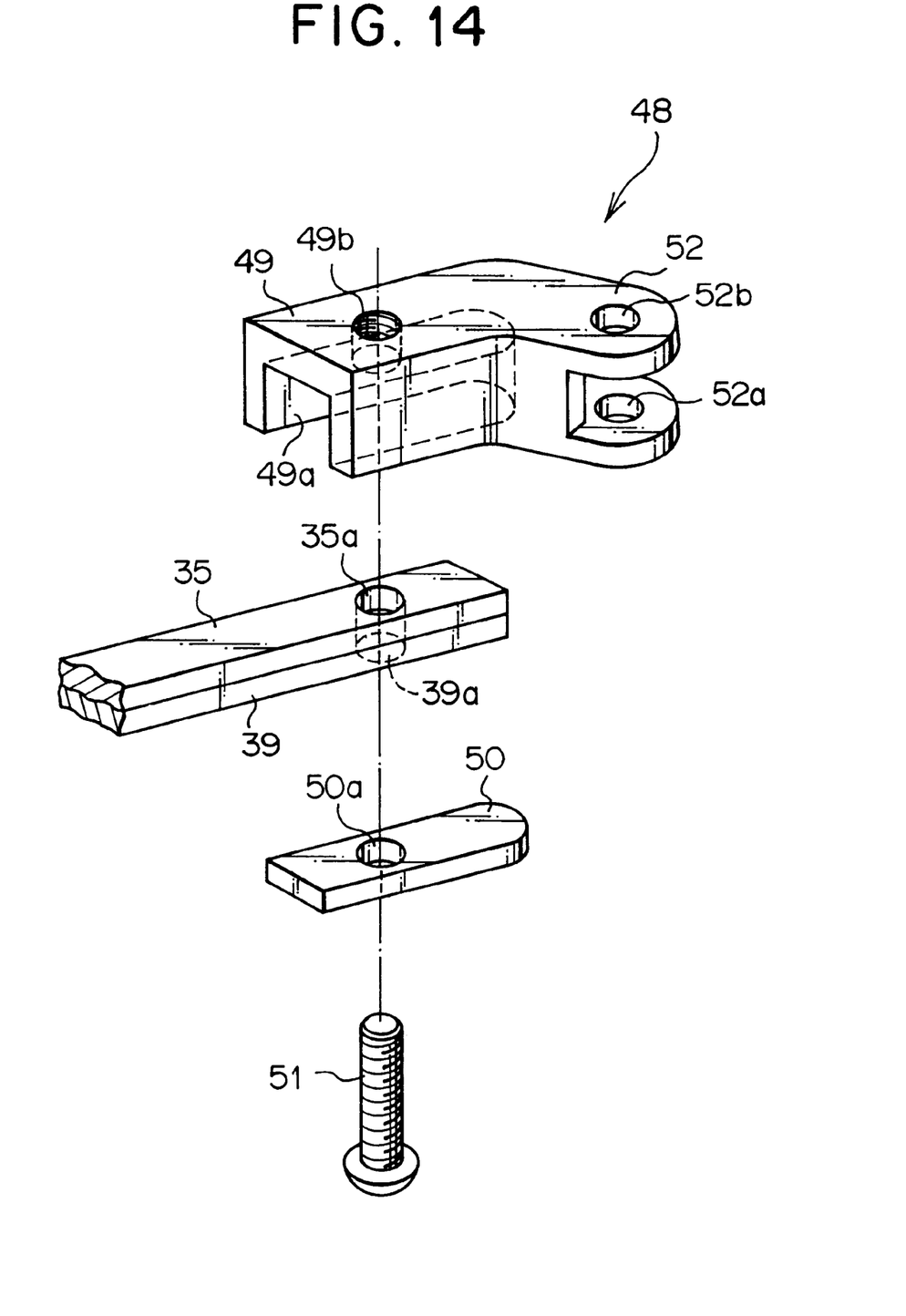
FIG. 14 is an enlarged view of an end piece shown in FIG. 8.

The end piece 48 is used to secure the installing section 35 of the upper half 32 and the installing section 39 of the lower half 36 into one piece; it is constituted by a main body 49, a cover 50, and a screw 51.

The main body 49 is L-shaped, and one end thereof is provided with a groove 49a at the bottom side thereof. The cover 50 is made sufficiently large to fill the cavity of the groove 49a.

Provided at the center of the cover 50 is an aperture 50a. A tapped hole 49b is provided at the portion of the main body 49 which corresponds to the aperture 50a.

The other end of the end piece 48 is provided with a hinge 52 for pivotally installing a temple 54.

The hinge 52 is formed by forking the other end of the main body 49; the bottom counterpart is provided with an aperture 52a and the top counterpart is provided with a tapped hole 52b.

One end portion of the temple 54 is positioned between the top and bottom counterparts, and a screw 53 is inserted from below into the aperture 52a and the aperture (not shown) of the temple 54 and screwed into the tapped hole 52b of the top counterpart, thus attaching the temple 54 to the end piece 48. The other end portion of the temple 54 is bent downward and a tip 55 made of a synthetic resin material is attached to the bent end portion.

Figure 15:
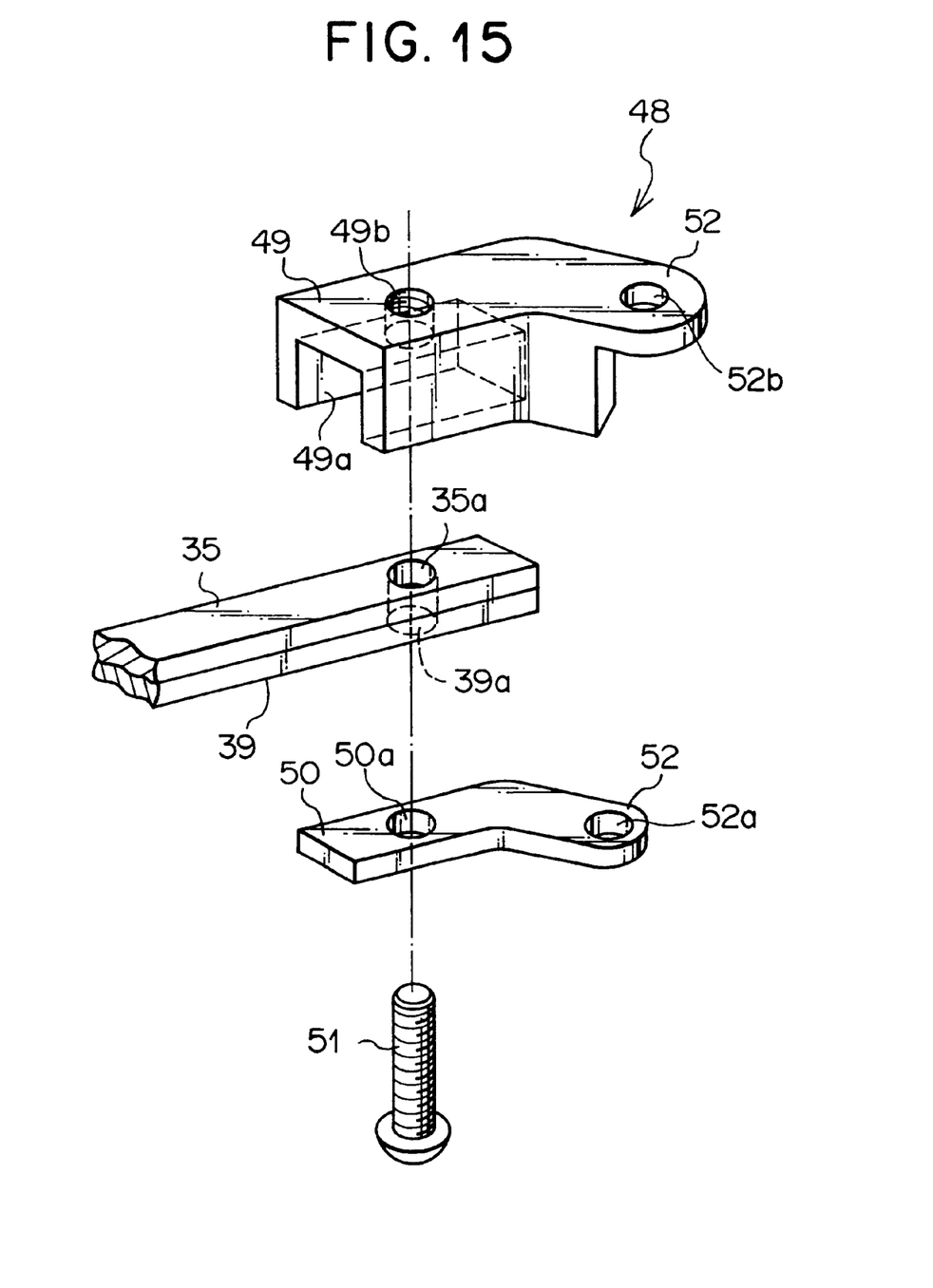
FIG. 15 is an enlarged view of another example of the end piece.
Figure 16:
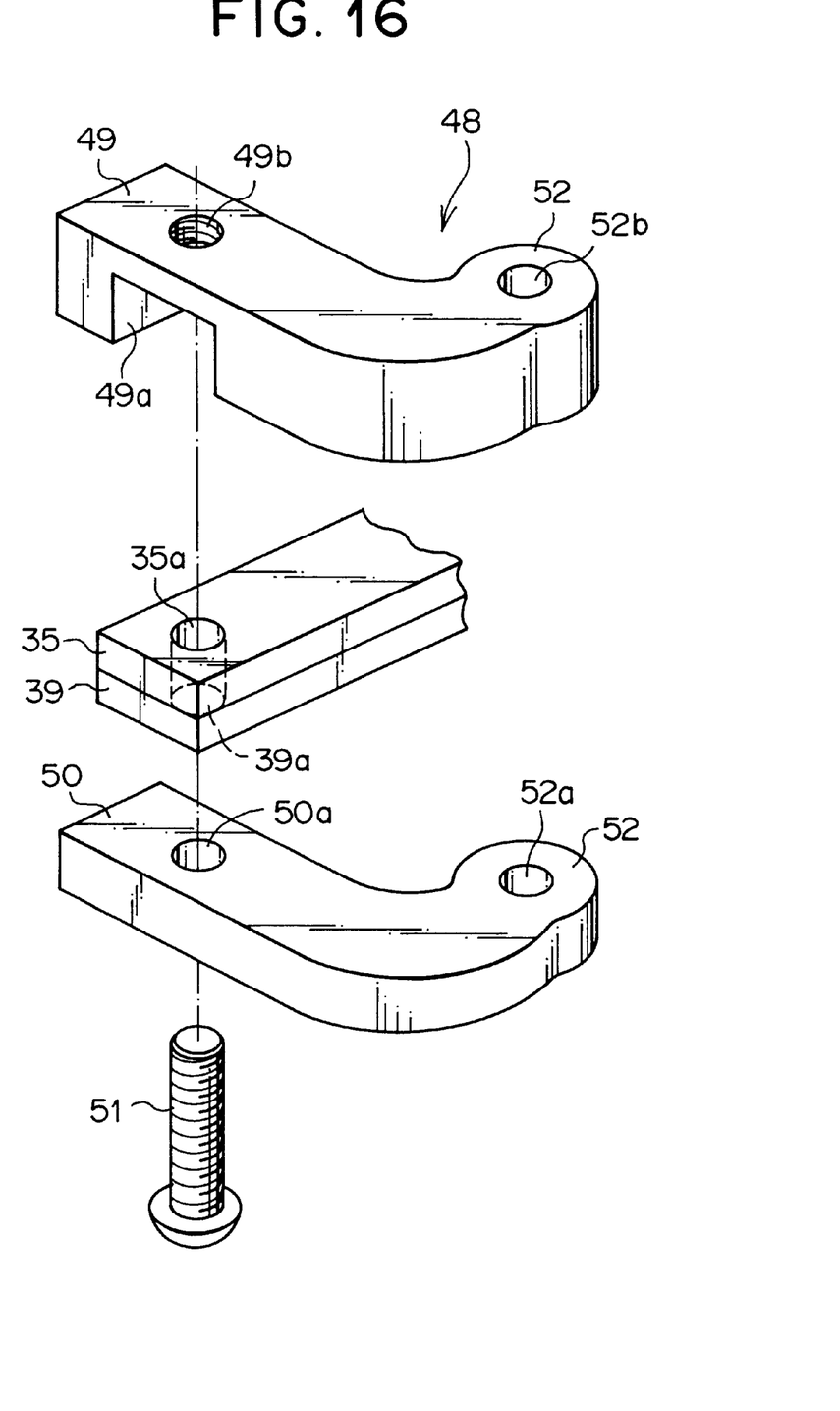
FIG. 16 is an enlarged view of yet another example of the end piece.

As shown in FIG. 15 and FIG. 16, the end piece 48 may alternatively be constituted by the L-shaped main body 49, the L-shaped cover 50 for filling the cavity of the groove 49a, and the screw 51 for fixing the two installing sections 35 and 39 in the groove 49a. Further alternatively, the end piece 19 shown in the previous embodiment may be used.

The bridge connecting member 40 may be the bridge connecting member 10 shown in the previous embodiment.

In this embodiment, the main body 49 is L-shaped, and the portions for fixing the two installing sections 35 and 39 and the hinge 52 for the connection to the temple 54 are made integral; alternatively, however, the portions for fixing the two installing sections 35 and 39 and the hinge 52 may be formed separately, then combined into one piece by welding, screwing, or by other means.

To assemble the frame 31 for eyeglasses, the upper half 32 and the lower half 36 are combined such that the half-rims 33 and the half-rims 37 form two rims, and the bridge 34 and the bridge 38 are butted against each other, and the installing section 35 and the installing section 39 are also butted against each other.

Then, the upper member 41 is positioned on the bridge 34, the rear surface of the base 42 is butted against the front sides of the two bridges 34 and 38, and an end of the half-rim 33 is positioned in the groove 43a of the protuberance 43.

The lower member 44 is positioned under the bridge 38, the bridge 38 is positioned in the groove 44a, and the connecting screw 45 is inserted in the aperture 44b and the aperture 43b to position the jaw 45b in the recessed section 44c.

The threaded section 45a of the connecting screw 45 which juts out of the upper member 41 is screwed into the nut 47, and the pad 46 made of a synthetic resin material is attached to the pad arm 45c. Thus, the two bridges 34 and 38 are clamped between the upper member 41 and the lower member 44.

Plastic or glass lenses are positioned between the two half-rims 33 and 37, and with both installing sections 35 and 39 butted against each other, the lenses are positioned in the grooves 49a of the main bodies 49 of the end pieces 48. The cover 50 is positioned in the cavity of the groove 49a, and the screw 51 is inserted in the aperture 50a of the cover 50 and the apertures 35a and 39a of the two installing sections 35 and 39, respectively, so as to screw it in the tapped hole 49b.

The temples 54 are attached, via the screws 53, to the hinges 52 on the other ends of the end pieces 48 to complete the assembly of the frame 31 for eyeglasses.

In the frame 31 for eyeglasses, the upper half 32 and the lower half 36 are respectively formed using a single material, the two bridges 34 and 38 are secured by the bridge connecting member 40, and the two installing sections 35 and 39 are assembled into one piece by using the end pieces 48, thus reducing the number of parts to be machined and also obviating the need for welding during the assembly process.

Hence, the machining and assembly can be made easier, permitting a considerably reduced time and effort required for the assembly with resultant markedly higher production efficiency.

Moreover, since there will be no defective product attributable to defective welding, the quality of the product is hardly affected by the experience or judgment of workers, so that high quality of the products can be obtained at all times.

FIG. 17 through FIG. 23 show a third embodiment of the frame for glasses in accordance with the present invention. A frame 61 for eyeglasses is equipped with an upper half 62, a lower half comprised of a bridge rim portion 66 and bottom end rim portions 67, a bridge connecting member 70, end pieces 79, and temples 86.

Figure 17:
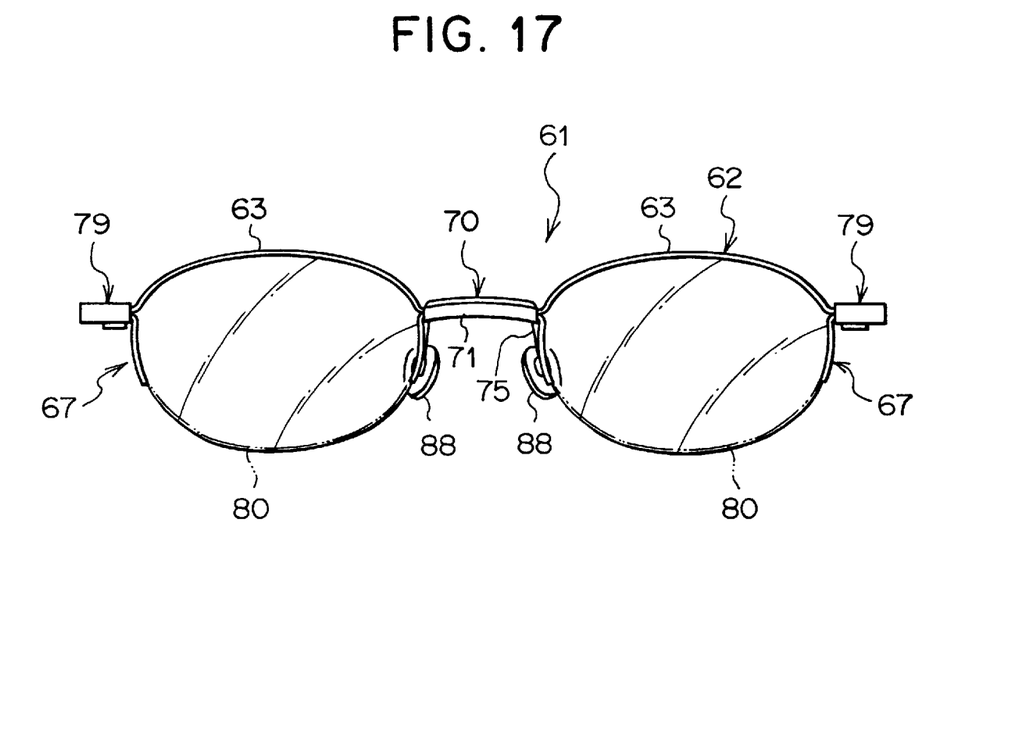
FIG. 17 is a schematic general view showing a third embodiment of a frame for eyeglasses in accordance with the present invention.
Figure 18:
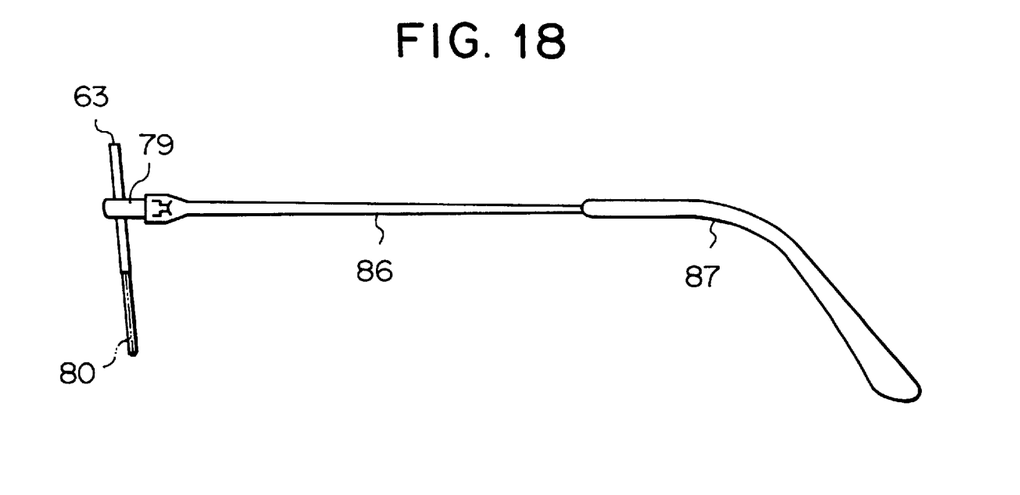
FIG. 18 is a side view of the frame for eyeglasses shown in FIG. 17.
Figure 19:
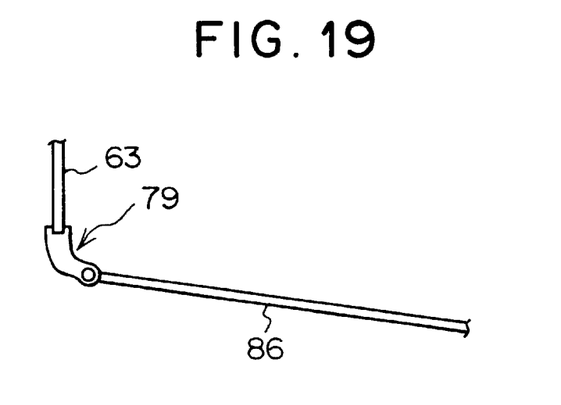
FIG. 19 is a partial top plan view of the frame for eyeglasses shown in FIG. 17.
Figure 20:
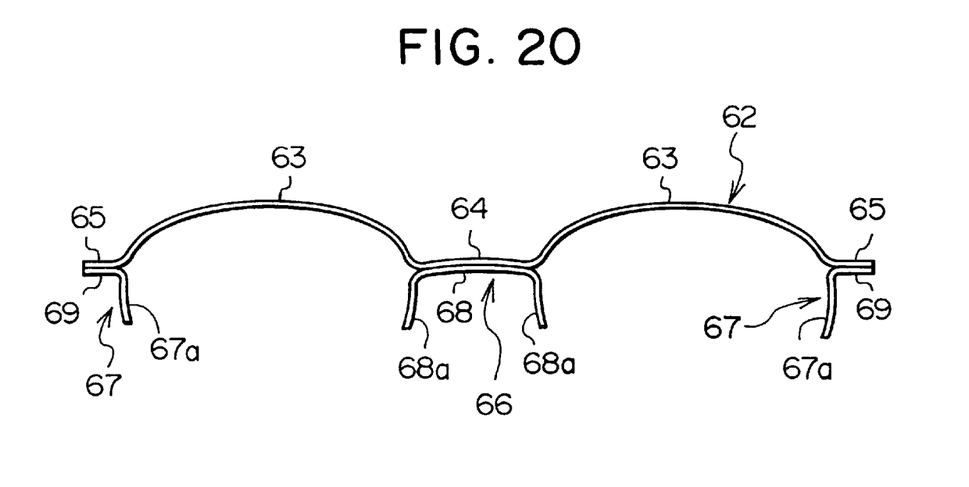
FIG. 20 is a schematic diagram showing the relationship between an upper half and a lower half.

The upper half 62 is made by bending a single metal rod by a press or the like or by casting. The upper half 62 has a pair of half-rims 63, 63 spaced away from each other with a predetermined interval provided therebetween, a bridge 64 between the two half-rims 63, 63, and installing sections 65, 65 on the outer sides of the two half-rims 63, 63. Each of the installing section 65 has an aperture (not shown) at the center thereof.

The bridge rim portion 66 is also made by bending a single metal rod by a press or the like, or by casting; it is constructed by a bridge 68 which is nearly as long as the bridge 64 of the upper half 62, and rim segments 68a extending downward from both ends thereof.

One end of each of the bottom end rim portions 67 is formed on an installing section 69 and the other end thereof is formed on a rim segment 67a.

Figure 21:
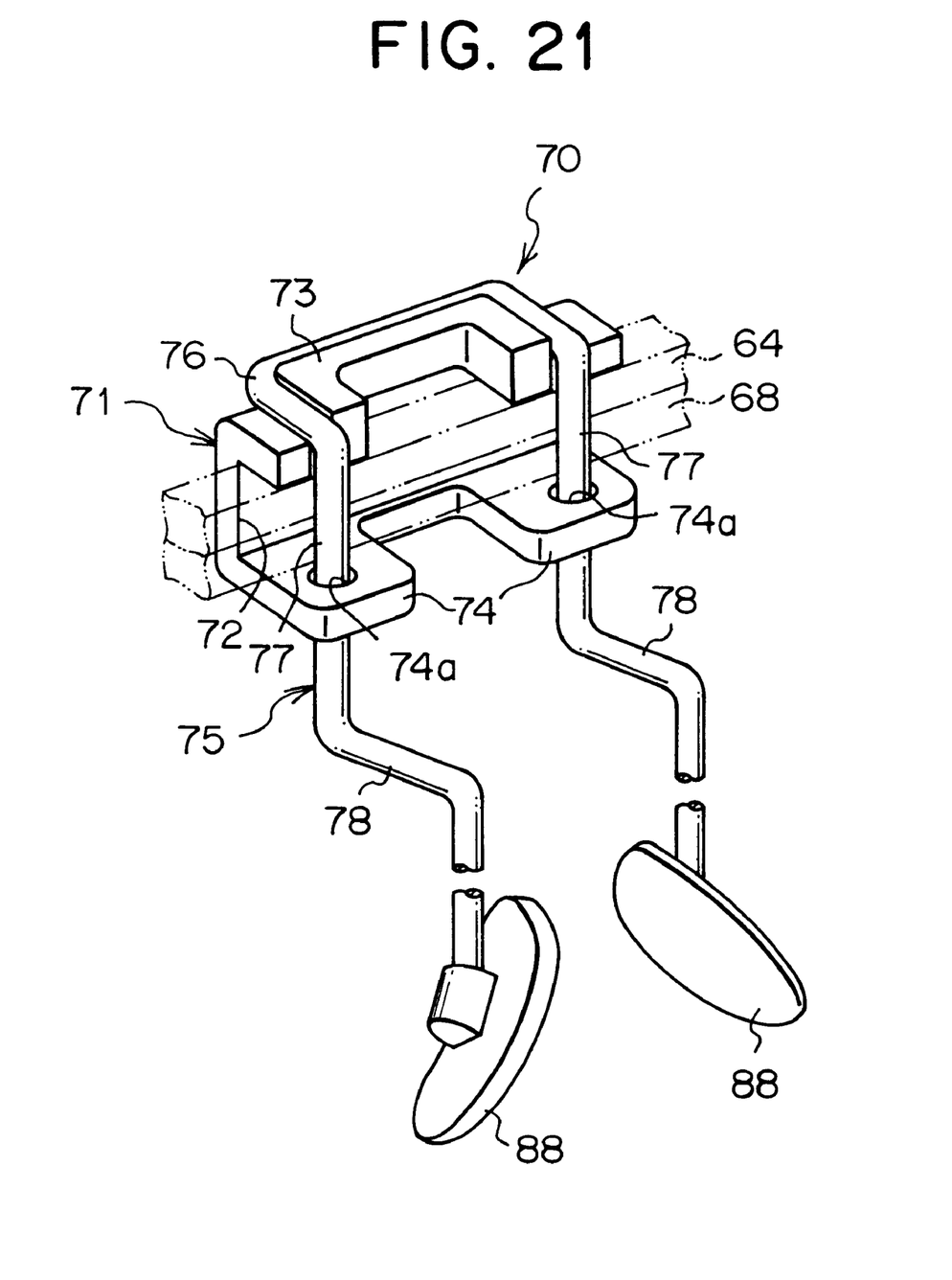
FIG. 21 is an enlarged view of a bridge connecting member shown in FIG. 17.

The bridge connecting member 70 has a main body 71, a holding member 75 attached to the main body 71; it integrally joins the bridge 64 and the bridge 68.

The main body 71 is made of a metal, and it has approximately the same length as the bridge 64 and the bridge 68. Formed at the rear of the main body 71 is a groove 72 where the two bridges 64 and 68 are positioned. A protuberance 73 is provided on the top surface of the main body 71; the central part of the bottom of the groove 72 is cut out to form projections 74, 74 which have apertures 74a, 74a.

The holding member 75 is formed by machining a metal rod material; it is comprised of a C-shaped fitting section 76 which is engaged with the protuberance 73 of the main body 71, holding sections 77, 77 which extend over the groove 72 of the main body 71 from both ends of the fitting section 76 and penetrate the apertures 74a, 74a, and pad arms 78, 78 extending from the holding sections 77, 77.

The bottom ends of the pad arms 78, 78 are respectively provided with pads 88, 88.

According to the configuration described above, even if the holding member 75 is deformed inward, there is no danger of its coming off.

The bridge connecting member 70 may be the bridge connecting member 10 shown in the first embodiment or the bridge connecting member 40 shown in the second embodiment.

Figure 22:
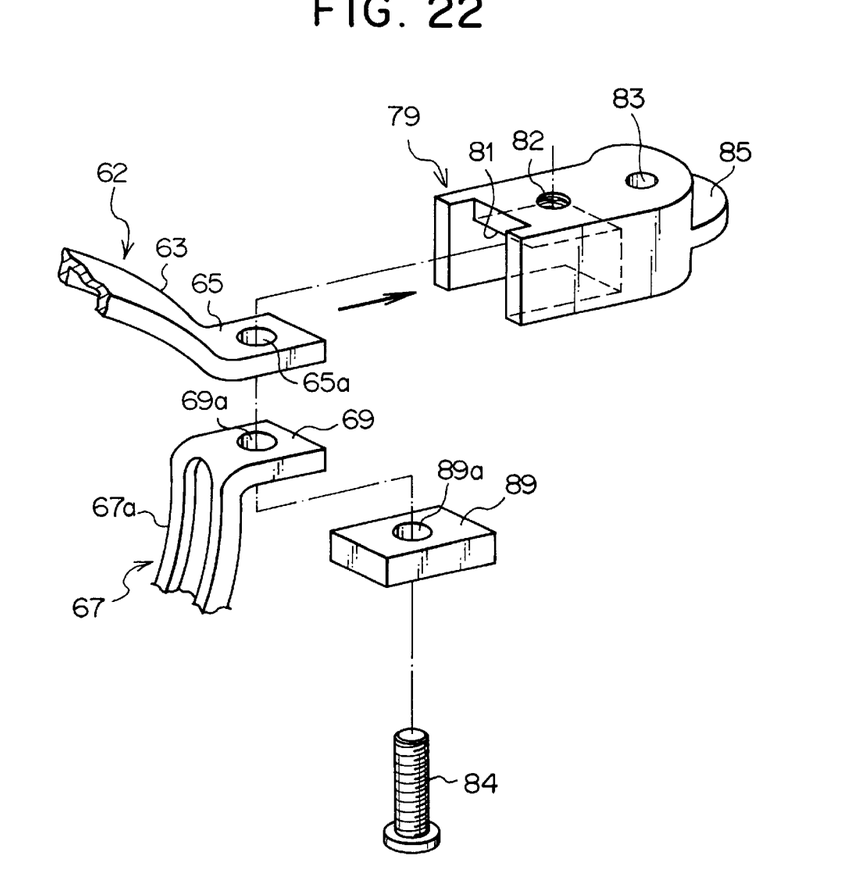
FIG. 22 is an enlarged view of an end piece shown in FIG. 17.
Figure 23:
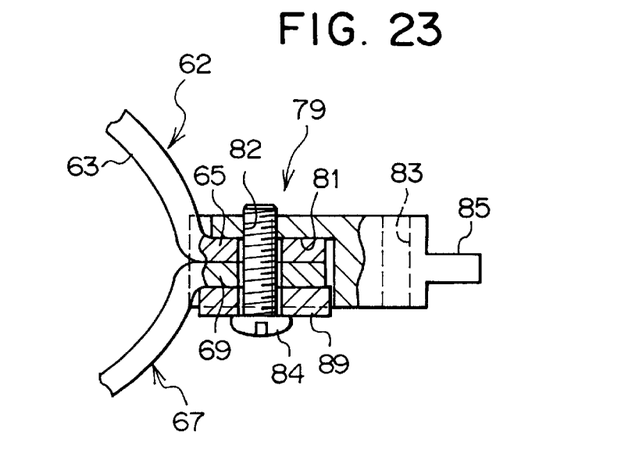
FIG. 23 is a cross-sectional view showing the end piece shown in FIG. 22 which has been assembled.

The end pieces 79 integrally join the upper half 62 and the bottom end rim portion 67. The end pieces 79 are curved; one end of each of them is provided with a groove 81 wherein the installing section 65 of the upper half 62 and the installing section 69 of the bottom end rim portion 67 are positioned, and the other end thereof is provided with a locking section 85 for the connection with the temple 86 and an aperture 83. The groove 81 has a tapped hole 82.

The two installing sections 65 and 69, and a presser piece 89 can be positioned in the groove 81; these components respectively have apertures 65a, 69a, and 89a which match the tapped hole 82.

A screw 84 is inserted in the respective apertures 65a, 69a, and 89a before it is threadly engaged to the tapped hole 82. This secures both installing sections 65 and 69 to the end piece 79.

Each of the temples 86 can be screwed through the aperture provided at one end portion thereof and through the aperture 83 of the end piece 79 such that it is allowed to move circularly; the other end portion is bent downward to which a tip 87 made of a synthetic resin material is attached.

In the frame 61 for eyeglasses explained above, eye wires 80 made of nylon or the like may be installed between the rim segments 68a, 68a on both ends of the bridge rim portion 66 and the rim segments 67a, 67a of the bottom end rim portions 67, 67.

A lens may be installed such that the full periphery thereof is pressed by the half-rim 63 of the upper half 62, the rim segment 67a of the bottom end rim portion 67, the rim segment 68a of the bridge rim portion 66, and the transparent wire 80 made of nylon or the like.

Screwing the end pieces 79 and the temples 86 together allows the frame for eyeglasses to be assembled, obviating the need for welding.

The absence of welded spots, therefore, enables considerably reduced time and effort required for assembly with consequent markedly higher production efficiency.

The absence of welded spots means that the quality of the products does not depend on the experience or judgment of individual workers, thus making it possible to provide high quality products at all times.

The combinations of the upper half, the lower half, the bridge connecting member, and the end pieces are not limited to those described in the foregoing embodiments; any combinations will do.

Thus, according to the present invention configured as explained above, the upper half, the lower half, the bridge connecting member, and the end pieces can be combined to assemble the frame for eyeglasses.

Hence, there is no welded spots. This permits considerably reduced time and effort required for assembly, so that markedly higher production efficiency can be achieved.

The absence of welded spots means that the quality of the products does not depend on the experience or judgment of individual workers, thus making it possible to provide high quality products at all times.

What is claimed is:

1. A frame for eyeglasses, which frame comprising:

an upper half comprised of a pair of half-rims spaced away from each other with a predetermined interval provided therebetween, a bridge for connecting the inner sides of said half-rims, and installing sections respectively provided on the outer sides of said two half-rims;

a bridge rim portion composed of rim segments formed at both ends thereof and a bridge which approximately matches the bridge of said upper half;

a bottom end rim portion composed of a rim segment and an installing section which approximately matches the installing section of said upper half;

an eye wire is extended between the rim segment of said bridge rim portion and the rim segment of said bottom end rim portion;

an end piece for connecting the installing section of said upper half and the installing section of said bottom end rim portion;

a temple connected to said end piece;

a bridge connecting member for securing the bridge of said upper half and the bridge of said bridge rim portion; and wherein a lens is held by the half-rim of the upper half, the bridge rim portion, the bottom end rim portion, and the eye wire.

2. A frame for eyeglasses according to claim 1, wherein said bridge connecting member is composed of a main body which has a groove in which the bridge of said upper half and the bridge of the bridge rim portion can be fitted, and a holding member for integrally securing both bridges in the groove of said main body, and a pad can be attached to a bottom end of said holding member.

3. A frame for eyeglasses according to claim 1, wherein the eye wire is made of Nylon.

* * * * *